March 24, 1959
J. F. McDONALD
2,879,396
PLASTICS-TREATING APPARATUS
Filed May 3, 1957
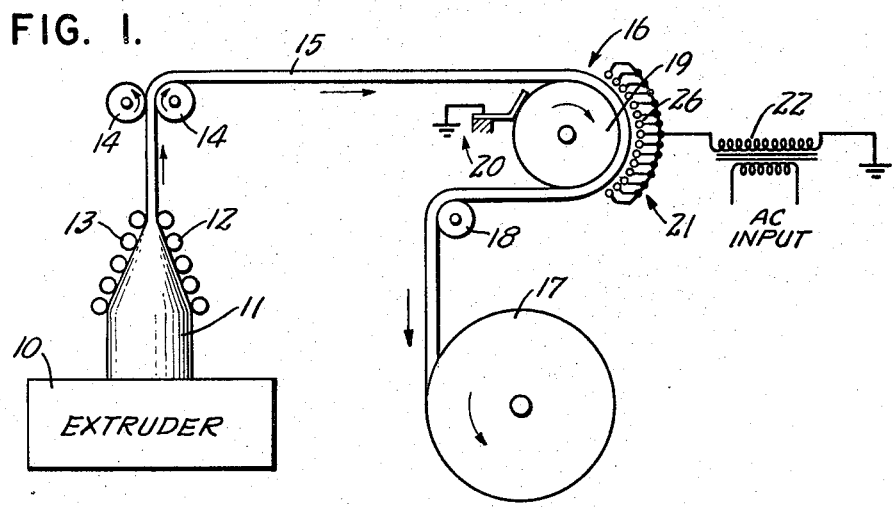
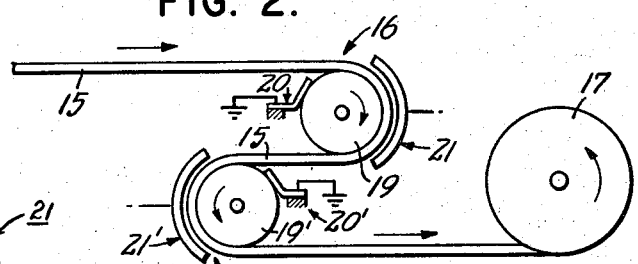
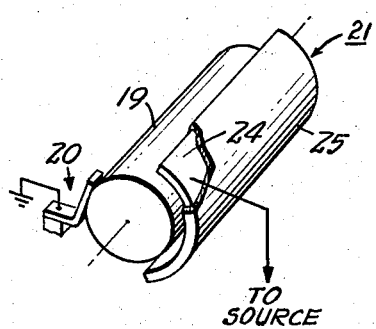
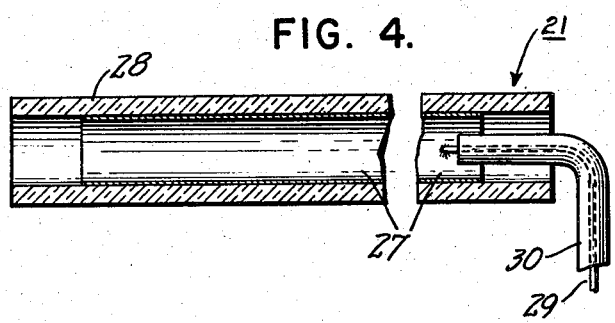
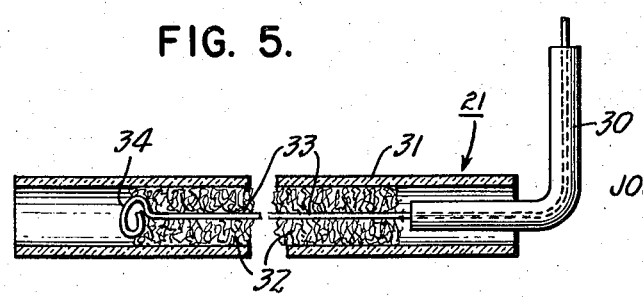
INVENTOR
JOSEPH F. McDONALD
BY
ATTORNEYS

United States Patent Office 2,879,396
Patented Mar. 24, 1959

2,879,396

PLASTICS-TREATING APPARATUS

Joseph F. McDonald, Carle Place, N.Y.

Application May 3, 1957, Serial No. 656,823

3 Claims. (Cl. 250—49.5)

My invention relates to an improved method and means for surface-treating plastic sheet material in order to render the surface thereof better adapted to receive inks, glues and other materials to be bonded thereto.

Plastics, such as polyethylene, which are wax-like substances, are in their normal state inherently unadapted to receive the bonding of inks and glues to the surface, unless the surface to receive such inks and glues is modified by suitable treatment. In the past, this has been accomplished, in the case of polyethylene, by immersion in a chlorine bath, by flame treatment, and similar methods. The present invention relates to electrical means for accomplishing the desired purpose.

It is an object of the invention to provide an improved method and means of the character indicated.

It is another object to provide an improved means for surface-treating plastic sheet by electrical means without relative motion between physically contacting parts.

It is another object to meet the above objects with apparatus in which the mechanism can be relatively foolproof and not subject to break-down and continuous maintenance problems.

It is a specific object to provide a means whereby substantial quantities of ozone may be generated for uniform application to continuously moving plastic sheets to be treated.

It is another object to meet the above objects with apparatus inherently adaptable to the continuous substantially simultaneous surface-treatment of one or both sides of a plastic sheet.

Other objects and various further features of novelty and invention will be pointed out or will occur to those skilled in the art from a reading of the following specification, taken in conjunction with the accompanying drawings. In said drawings, which show, for illustrative purposes only, preferred forms and methods of the invention:

Fig. 1 is a simplified diagram schematically indicating important parts of my overall process, and illustrating one general form of the invention;

Fig. 2 is a fragmentary diagram similar to Fig. 1 but illustrating a modification;

Fig. 3 is a partly broken-away fragmentary perspective view of an alternative part for the apparatus of Figs. 1 or 2;

Fig. 4 and Fig. 5 are enlarged longitudinal sectional views through alternative electrode constructions of the type described in connection with Fig. 1.

Briefly stated, my invention contemplates an improved method of surface-treating plastic sheet material, comprising subjecting the plastic sheet to a strong electrostatic field in which the surface to be treated is exposed to air, with a strong dielectric material interposed between the air gap and the adjacent electrode, in such manner as to assure against premature breakdowns or arcing, and at the same time to assure uniform development of an ozone-rich atmosphere in the electric field over a substantial area of the passing plastic sheet. Various forms of electrodes for this purpose will be shown and described.

Referring to Fig. 1 of the drawings, my invention is shown in application to a continuous process involving the formation of plastic tubing of the variety used in plastic bags, as used for the merchandising of toys, confections, and other small articles and materials. The plastic may be one of any number of varieties as, for example, polyethylene. I have generally indicated an extruder 10 capable of continuously delivering a tube 11 of plastic sheet, a portion of one side of which is to be treated, for reception of a printing ink, or for reception of a decorative lamination, or otherwise to identify the bags which will ultimately be formed out of the plastic tube 11. Tent rolls 12—13 serve to progressively and continuously flatten the tubular material 10, and squeeze rolls 14 assure a tight sandwich of the plastic material at 15. Thus, by the time the sandwich 15 reaches the surface-treating stage 16 of my invention, all or substantially all air has been excluded from within the sandwich 15. After passing the surface-treatment station 16, the treated material may be taken up on a reel 17, after being guided by suitable means 18. The actual printing or application of laminations for decorative purposes may take place at a later time and in a totally different location, because once the surface treatment has been developed, the treated surface is permanently conditioned to receive applied inks, glues or the like, with permanent bonding.

The surface-treating station 16 in Fig. 1 may include a large roll 19 continuously moving with the squeezed sandwich 15 so as to develop no relative motion with respect thereto. The roll 19 is electrically conductive and forms one of the electrodes for developing the electrostatic field needed for performance of my invention. Thus, the roll 19 may be a chromium-plated copper or brass member, or it may be of stainless steel. I find it convenient that the electrode 19 be the grounded electrode, and have so indicated at 20.

Closely spaced from the plastic 15 as it passes over the roll 19, and for a substantial arcuate extent thereof, I provide stationary electrode means 21, which may be cylindrically arcuate. The electrode 21 is shown supplied by a high-voltage alternating-current source, as by way of transformer means 22, and in accordance with a feature of my invention, the conductive element or elements of the electrode 21 are isolated from the adjacent surface of the plastic 15 by means of a high-strength dielectric material, such as glass, as will more clearly appear.

In Fig. 3, I illustrate one possible embodiment of the electrode 21, wherein the conducting member 24 thereof is contoured in accordance with the adjacent contour of the roll 19, and is thus preferably cylindrically arcuate and generally concentric about the rotation axis of the roll 19. The high-strength dielectric material is at least interposed between electrode 24 and the air space immediately above the adjacent surface of plastic 15, but in the form shown, such dielectric material is shown at 25 as a coating of glass extending over the entire surface of the electrode 24.

It will be appreciated that the configuration of the stationary electrode 21 may take various forms, as long as one takes the precaution of interposing a high-strength dielectric material, such as glass, between the conductive element of the electrode 21 and the adjacent surface to be treated on the plastic 15. In Fig. 1 I schematically suggest by the plurality of small adjacent circles 26, that the electrode 21 may be a composite or array of like elongated, closely spaced electrode elements, as, for example, of one of the varieties shown in Figs. 4 and 5. In Fig. 4, such an electrode element appears as a tube 27 of conductive material, such as copper, contained within a tube of high-strength dielectric material 28, such as a glass. Inasmuch as the tube 27 is covered only on its outer surface, I indicate my preference that the glass tube 28 shall be substantially more axially extensive than the metal tube 27, thus avoiding end arcing. Electrical connection to the conductive inner element 27 is provided by a lead 29 encased in high-voltage insulation 30.

In the form of Fig. 5, the high-strength dielectric element is again a tube 31 preferably extending longitudinally beyond both ends of the inner conductive element. In the conductive element is a tight wad of conductive wool, such as steel wool 32, and contact to the body of the wool 32 is established by an elongated lead wire 33, extending generally centrally through the same and terminating for retaining purposes at an enlarged base or loop 34. Again, the external connection to the lead 33 is protected by high-voltage insulation 30.

In the arrangement of Fig. 2, I illustrate that merely by providing an additional treatment station 35 immediately following the station 16, I can virtually simultaneously and continuously treat the opposite side of the continuously running plastic sheet, in accordance with the principles discussed for the station 16. Parts of stations 16—35 correspond to each other, and have therefore been given the same reference numerals, but with primed notation.

While the actual chemical reaction or electrochemical reaction involved in performing my new process or in using my new apparatus is not clearly understood by me, I believe that it is directly related to the presence of a relatively high concentration of ozone over the surface to be treated. At least, I know that substantial quantities of ozone are generated where air is admitted to the surface to be treated in the electrostatic field, and that under such conditions, superior surface treatments are achieved. Of course, other parts of the plastic 15 are subjected to the same field, but because of the squeezing at 14, and because of application to the grounded electrode 19 directly, there is no possibility of air reaching either the surface adjacent the grounded electrode 19 on the one hand, or either of the inner plastic surfaces on the other hand. Thus, ozone is only presented to the surface to be treated. I find that the development of the desired electrostatic field can be maintained for very substantial periods without breakdown of materials, as long as sufficiently high-strength dielectric materials are employed in the electrode 21; and because this electrode 21 never contacts the plastic, it is possible to achieve the desired treatment without producing any visible marring defects on the treated surface or elsewhere on the plastic.

While I have described the invention in detail for the preferred forms illustrated, it will be understood that modifications may be made within the scope of the invention as defined in the claims which follow.

I claim:

1. Apparatus for continuously surface-treating plastic for improved adherence properties, comprising first electrode means comprising an elongated roll mounted for continuous rotation, feed means for continuously applying plastic sheet in direct arcuately extensive continuous contact with said roll with said roll rotating in non-slip relation with the moving plastic sheet, second electrode means comprising a fixed plurality of like elongated electrode members positioned in radially spaced relation with said roll and in angularly spaced relation over an extensive portion of the area of contact of plastic sheet with said roll, each of said electrode members comprising an elongated tube of high-strength dielectric material with elongated electrically conducting means including a packing of conductive wool contained therewithin and extending short of the longitudinal ends of said tube, means electrically interconnecting all conducting means of said plurality, and means for applying an electric potential between said last-defined means and said first electrode means.

2. Apparatus according to claim 1, in which said dielectric material is glass.

3. Apparatus according to claim 1, in which a further elongated roll and associated fixed plural electrode members are positioned in series with the plastic sheet fed by said feed means, the direction of rotation of said further roll being opposite to that of said first-mentioned roll, so that the opposite side of the plastic sheet may be continuously processed.

References Cited in the file of this patent

UNITED STATES PATENTS

| 2,740,184 | Thomas | Apr. 3, 1956 |
| 2,802,085 | Rothacker | Aug. 6, 1957 |
| 2,811,465 | Greig | Oct. 29, 1957 |

FOREIGN PATENTS

| 510,068 | Belgium | Apr. 25, 1952 |